L. B. Southworth,
Sharpening Rotary Saws.
No. 42,124. Patented Mar. 29, 1864.

Witnesses.
J W Coombs
G W Reed

Inventor.
L. B. Southworth
per Munn & Co.
attorneys

UNITED STATES PATENT OFFICE.

L. B. SOUTHWORTH, OF DEEP RIVER, CONNECTICUT.

IMPROVEMENT IN JOINTING AND BURRING SAWS.

Specification forming part of Letters Patent No. 42,124, dated March 29, 1864.

*To all whom it may concern:*

Be it known that I, L. B. SOUTHWORTH, of Deep River, in the county of Middlesex and State of Connecticut, have invented a new and Improved Machine for Jointing and Burring Saws; and I do hereby declare that the following is a full, clear, and exact description of the same, reference being had to the accompanying drawings, forming a part of this specification, in which—

Figure 3:
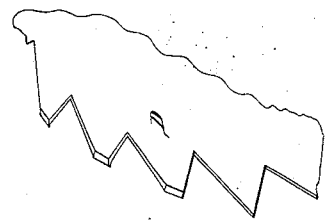
Figure 2:
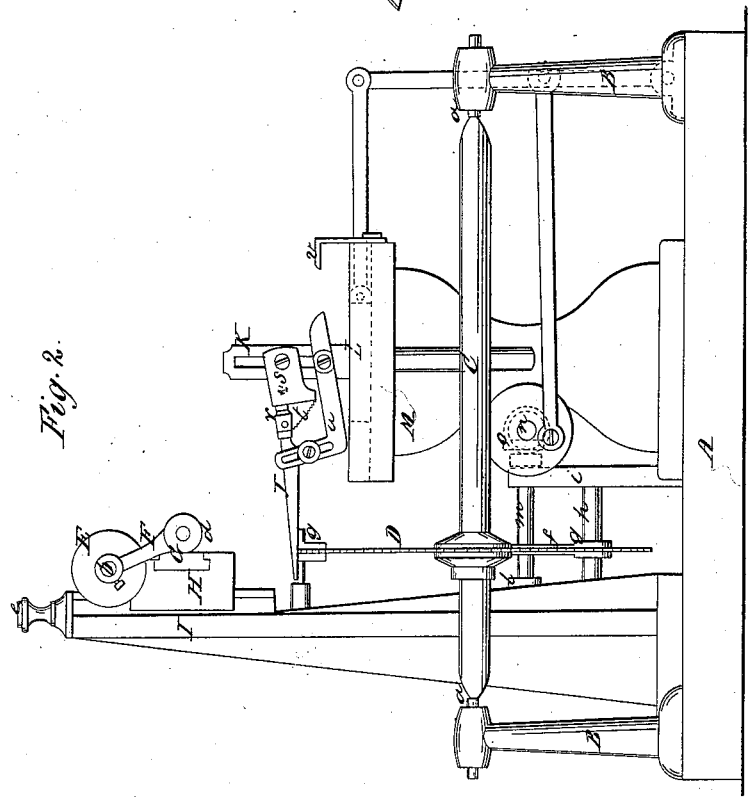
Figure 1:
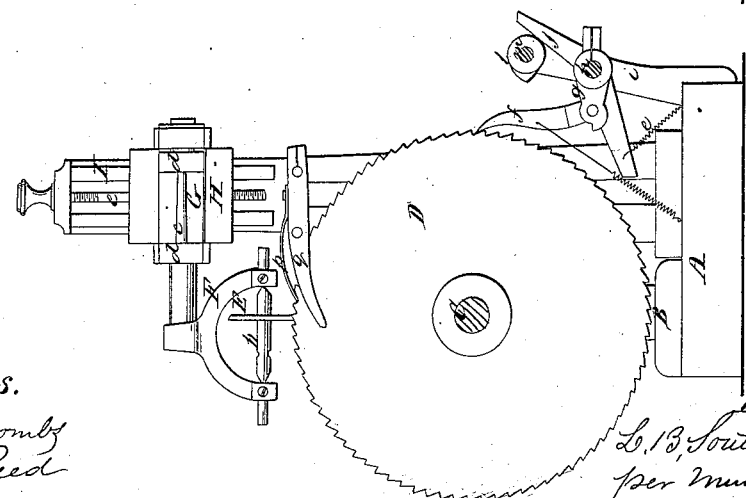

Figure 1 represents a sectional front elevation of the jointing device. Fig. 2 is a side elevation of the whole machine. Fig. 3 is a perspective view of some teeth after the same are completed.

Similar letters of reference in the three views indicate corresponding parts.

This invention consists in a vertically-adjustable head with a transverse slide which forms the bearings for the pivot of a swinging frame carrying the jointing wheel or cutter, in combination with two pawls, one to feed the saw by its action on the teeth and the other to arrest it in the desired position in such a manner that the cutter or jointing-wheel can be readily adjusted to saws of different diameters, and the operation of jointing can be performed perfectly uniform with little effort and with the greatest accuracy.

It consists, also, in the employment for the purpose of burring saws of a triangular tool or blank file which is secured to a reciprocating carriage and combined with a self-acting dog in such a manner that in moving the carriage toward the saw the tool is pressed down into the teeth, and in moving the carriage back the tool is raised by the action of the dog and the saw allowed to turn and to bring the next succeeding tooth in the proper position to be acted upon by the tool.

To enable those skilled in the art to make and use my invention, I will proceed to describe it.

A represents a frame or platform, which is provided with two standards, B, forming the bearings for adjustable centers $a$, to receive and hold the spindle C, which carries the saw D.

By means of the adjustable centers the saw is adjusted in the proper position under the jointing cutter or wheel E. This wheel consists of a disk of wood or other soft material, the edge of which is slightly beveled and covered with emery; or said wheel may be constructed in any other desirable manner. It is mounted on an arbor, $b$, which has its bearings in a swinging frame, F, and to which a rapid rotary motion is imparted by a belt or in any other desirable manner. The frame F is suspended from a rod, $c$, which has its bearings in lugs $d$, projecting from a slide, G. This slide is fitted into a carriage, H, and it is adjustable in a transverse direction, so that the cutter-wheel E can be brought exactly over the center of the saw D. The carriage H slides up and down in suitable ways formed in the upper end of a standard, T, which rises from the platform A, and it (the carriage) is adjustable in a vertical direction by means of a screw-spindle, $e$. By means of this screw-spindle the cutter-wheel can be adjusted in the proper position to correspond to the diameter of the saw to be jointed. The saw is fed from tooth to tooth by the action of a pawl, $f$, which is pivoted to the end of an arm, $g$, that is firmly attached to a rock-shaft, $h$. This rock-shaft has its bearings in two standards, $i$, which rise from the platform A, and an oscillating motion is imparted to it by a lever, $j$, which is firmly secured to said rock-shaft, and one end of which connects with a spring, $k$, which causes its other end to bear against a cam, $l$. This cam is rigidly secured to a shaft, $m$, to which a continuous rotary motion is imparted from the driving-shaft $n$, with which it connects by a bevel-gear, $o$, or in any other suitable manner. As the shaft $m$ rotates, the cam $l$ strikes the lever $j$, and an oscillating motion is imparted to the rock-shaft $h$, and for each revolution of the shaft $m$ and cam $l$ the pawl $f$ propels the saw for one tooth. A spring-pawl, $p$, connected to the top of the slotted guide $q$, prevents the saw from turning back. By these means one tooth after the other is brought under the cutter-wheel E, and the operation of jointing can be effected with little labor. After the saw and cutter-wheel have been adjusted in the proper relation to each other motion is imparted to the shaft $m$ and to the cutter-wheel, and the operator takes hold of the swinging frame F, and imparts to it an oscillating motion far enough in either direction to carry the cutter-wheel clear across the face or edge of the saw. The point of the tooth is thereby slightly flattened down, as shown in Fig. 3, and after all the teeth have thus been jointed the saw is ready for the burring operation. This operation I effect by means of a triangular wedge shaped tool, J, formed similar to a triangular file-blank, and before commencing said operation the swinging frame F is turned up, carrying the cutter-wheel D out of the way of said burring-tool. The shank of this tool is secured in an arm, r, which is pivoted to a bracket, s, that is vertically adjustable in the slotted standard K. This standard rises from a carriage, L, which is guided by suitable ways on the top of the table M, and to which a reciprocating motion is imparted by suitable connections from the driving-shaft n. The arm r, which retains the tool, is pressed down by the action of a spring, t, and a dog, u, which is pivoted to the slotted standard K, raises the tool clear of the teeth of the saw whenever the carriage L approaches the rear end of its stroke.

In order to produce the required motion of the dog u, a hook, v, is secured to the edge of the table M, and as the rear end or tail of the dog u comes in contact with this hook the front end of the dog is raised and the tool is thrown out of contact with the saw-teeth.

The triangular tool is so adjusted in its socket that it bears on the point of the front side of the tooth at any given angle, and on imparting to the same a quick reciprocating motion, a burr is raised on each side of the tooth for the clearance of the saw. Then the tool T is adjusted to bear on the back side of the point of the tooth, in order to throw this burr raised forward, and produce the cutting edge. If this tool is used for small saws—such as are used in the manufacture of combs—the burr raised by it frequently has to be rubbed off, because it cuts too wide a kerf. For large saws the power with which the tool is pressed against the tooth must be increased, and by making the surface of the tool rough and increasing its speed a still more powerful effect is produced. The shape of the teeth when finished is shown in Fig. 3 of the drawings.

What I claim as new, and desire to secure by Letters Patent, is—

1. The rotating cutter-wheel E, arranged in the swinging frame F, in combination with the adjustable slide G and carriage H, and with the saw D and self-feeding pawl f, all constructed and operating in the manner and for the purpose substantially as herein shown and described.

2. The employment or use, for the purpose of burring saw-teeth, of the tool J, in combination with the reciprocating carriage L, constructed and operating substantially as herein specified.

3. The tool-holder r, dog u, and spring t, in combination with the tool J and carriage L, constructed and operating substantially as and for the purpose set forth.

L. B. SOUTHWORTH.

Witnesses:
JOSEPH B. BANNING,
A. H. BANNING.